United States Patent
Masis (10) Patent No.: US 11,436,001 B2
(45) Date of Patent: Sep. 6, 2022

(54) MITIGATING SOFTWARE-UPDATE RISKS FOR END USERS

(71) Applicant: RED HAT, INC., Raleigh, NC (US)

(72) Inventor: Alexander Braverman Masis, Raanana (IL)

(73) Assignee: RED HAT, INC., Raleigh, NC (US)

( * ) Notice: Subject to any disclaimer, the term of this patent is extended or adjusted under 35 U.S.C. 154(b) by 0 days.

(21) Appl. No.: 17/102,518

(22) Filed: Nov. 24, 2020

(65) Prior Publication Data

US 2022/0164175 A1    May 26, 2022

(51) Int. Cl.
| | | |
|---|---|---|
| G06F 8/65 | (2018.01) | |
| G06F 11/36 | (2006.01) | |
| G06F 3/0484 | (2022.01) | |
| G06N 20/00 | (2019.01) | |

(52) U.S. Cl.
CPC .............. *G06F 8/65* (2013.01); *G06F 3/0484* (2013.01); *G06F 11/362* (2013.01); *G06F 11/3668* (2013.01); *G06N 20/00* (2019.01)

(58) Field of Classification Search
CPC ...... G06F 8/65; G06F 11/362; G06F 11/3668; G06F 3/0484; G06N 20/00
See application file for complete search history.

(56) References Cited

U.S. PATENT DOCUMENTS

| | | | | |
|---|---|---|---|---|
| 9,588,876 | B2 * | 3/2017 | Swierc | ................ G06F 11/3668 |
| 10,175,978 | B2 | 1/2019 | Biddle et al. | |
| 11,061,667 | B1 * | 7/2021 | Gujarathi | ................ H04L 67/34 |
| 11,074,062 | B1 * | 7/2021 | Hosic | ........................ G06N 3/08 |
| 2015/0089297 | A1 * | 3/2015 | Johnson | .................. G06F 11/34 |
| | | | | 714/38.1 |
| 2019/0138431 | A1 * | 5/2019 | Holbrook | .................. G06F 8/65 |
| 2019/0294528 | A1 * | 9/2019 | Avisror | ..................... G06F 8/60 |
| 2020/0004532 | A1 | 1/2020 | Sobran et al. | |
| 2020/0097388 | A1 | 3/2020 | Bhat et al. | |
| 2020/0117443 | A1 | 4/2020 | Nandakumar et al. | |

(Continued)

FOREIGN PATENT DOCUMENTS

CN    105190548 B    6/2019

OTHER PUBLICATIONS

Aleem, S., et al., "Benchmarking Machine Learning Techniques for Software Defect Detection," International Journal of Software Engineering & Applications, 2015, https://www.researchgate.net/publication/279252183_Benchmarking_Machine_Learning_Techniques_for_Software_Defect_Detection.

(Continued)

*Primary Examiner* — Daxin Wu
(74) *Attorney, Agent, or Firm* — Kilpatrick Townsend & Stockton LLP (57) ABSTRACT

Software-update risks can be mitigated for end users by implementing some examples described herein. In one example, a system can receive an indication that an end user used a particular feature of an existing version of a software application on a computing device of the end user. The system can also determine that an update for the software application includes a code change to the particular feature. The system can generate a risk score for the update based on the code change. The system can then generate a graphical user interface indicating the risk score for the end user. This may assist the end user in determining whether to apply the update to the existing version of the software application.

17 Claims, 3 Drawing Sheets

(56) References Cited

U.S. PATENT DOCUMENTS

| | | | |
|---|---|---|---|
| 2020/0133830 A1 | 4/2020 | Sharma et al. | |
| 2021/0042216 A1* | 2/2021 | Magnezi | G06F 8/30 |
| 2021/0141718 A1* | 5/2021 | Sandhu | G06F 11/3688 |
| 2021/0149658 A1* | 5/2021 | Cannon | G06N 3/04 |
| 2021/0201418 A1* | 7/2021 | Mehedy | G06Q 40/08 |

OTHER PUBLICATIONS

Athanasiou, D., et al., "Test Code Quality and Its Relation to Issue Handling Performance," IEEE Transactions on Software Engineering, 2000, • https://ieeexplore.ieee.org/document/6862882.

Di Nucci, D., et al., "A Developer Centered Bug Prediction Model," IEEE Transactions on Software Engineering, 2017, • https://fpalomba.github.io/pdf/Journals/J5.pdf.

Felix, E.A., et al., "Predicting the Number of Defects in a New Software Version," PLoS ONE, 2020, https://journals.plos.org/plosone/article?id=10.1371/journal.pone.0229131.

Hammouri, A., et al., "Software Bug Prediction using Machine Learning Approach," International Journal of Advanced Computer Science and Applications, 2018, https://www.researchgate.net/publication/323536716_Software_Bug_Prediction_using_Machine_Learning_Approach.

Kapur, R., et al., "Estimating defectiveness of source code: A predictive model using GitHub content," ESEC/FSE, 2018, • https://arxiv.org/pdf/1803.07764.

* cited by examiner

MITIGATING SOFTWARE-UPDATE RISKS FOR END USERS

TECHNICAL FIELD

The present disclosure relates generally to software updates. More specifically, but not by way of limitation, this disclosure relates to mitigating software-update risks for end users.

BACKGROUND

After releasing a software application, software developers can provide software updates for the software application to end users. A software update is program code that is downloadable by end users to their computing devices for patching or replacing an existing (e.g., older) version of the software application on the computing devices. End users are the intended people for whom the software application was designed. Generally, a software update may resolve bugs, improve security, include new functionality, or remove existing functionality.

Before each software update is released to end users, the software developers may perform various software tests (e.g., unit tests, integration tests, and system tests) on the software update to help ensure that the software update is free from defects or meets other requirements. Once the software developers are satisfied that the software update is ready for release, the software developers may push the software update to an update server or otherwise make the software update available to the end users. The end users may then download the software update to their computing devices and install the software update thereon.

DETAILED DESCRIPTION

Software developers can provide software updates for a software application to end users. The end users generally expect such updates to improve the software application for their specific domains of use, which is not always the case. Some updates may be better suited to certain use cases than others, and some portions of an update may be better of better quality than others. Since different end users can use the same software application in different ways, the same update can impact end users differently. For example, the same update may impact one end user in a positive way and another end user in a negative way, depending on how the end users actually use the software application. It can therefore be risky for end users to apply such updates. Some end users may try to mitigate these risks by reading the release notes accompanying a software update, but that information is typically generalized for a large number of end users and may be incomplete or inaccurate. These limitations can make it challenging for end users to determine the potential impacts of applying a software update to a software application within the context of their specific use cases.

Some examples of the present disclosure can overcome one or more of the abovementioned problems by generating a risk score for an update to a software application based on how an end user uses the software application. A higher risk-score can indicate that the update is more risky (e.g., more likely to cause an undesirable consequence) for the end user, whereas a lower risk-score can indicate that the update is less risky for the end user. The risk score can then be output to the end user in a graphical user interface. Tailoring the risk score to how the end user actually uses the software application can assist the end user in making a more informed decision about whether to apply the update to the software application. This can help the end user avoid circumstances in which a particular software update may cause more harm than good with respect to the end user's particular use of the software application.

As one particular example, an end user may install a software application on a computing device. Examples of the software application can include a word processor, spreadsheet software, database software, simulation software, multimedia software, a web browser, utility software, etc. The software application may include a variety of features. Features can include options and functional capabilities available to the end user. The end user may use some features of the software application more frequently than other features. For example, the end user may frequently use one feature of the software application and may not use another feature of the software application at all. As a result, one update can have more or less of an impact on the end user than another update, depending on the specific features of the software application that are affected by the updates. The end user may wish to know how a particular update is going to impact his specific usage of the software application before applying (e.g., installing) the update, to avoid or mitigate any undesirable consequences of the update. To help the end user determine this impact, some examples of the present disclosure can generate and output a risk score associated with the particular update to the end user.

More specifically, a system of the present disclosure can first determine how the end user uses an existing version of the software application on the computing device. For example, the end user may activate a debugging mode of the software application on the computing device. Such debugging modes are traditionally designed for use by software developers during a debugging stage of the software development process, which occurs prior to releasing the software application to end users. If the end user activates the debugging mode and uses the software application while the software application is in the debugging mode, the software application may output debugging information indicating which features of the software application were used by the end user. Such debugging information can then be provided to the system for use in determining how the end user uses the software application. Additionally or alternatively, a software tracing tool can be used to identify which features of the software application are used by the end user. Software tracing tools can generate detailed logs about the behavior of a running software application. As the end user interacts with features of the software application, the software tracing tool can generate a log indicating which features of the software application were used by the end user. Such logs can then be provided to the system for use in determining how the end user uses the software application.

Next, the system can determine whether a particular update includes changes to one or more of the software application's features that were used by the end user. For example, the system can access first source code associated with the update. The system can access the first source code by retrieving the first source code from a code repository. The system can also access second source code associated with an existing version of the software application that is installed on the computing device. The system may also access the second source code by retrieving the second source code from a code repository. The system can compare the first source code to the second source code to determine if there is a code change associated with a feature used by the end user. A code change is a change to the source code of a software application. If there is a code change associated with a feature used by the end user, the system can determine a risk score based on the code change. The risk score can be a numerical value indicating a risk to the end user associated with applying the update.

The system can determine the risk score based on any number and combination of factors associated with the code change. Examples of such factors can include a test report associated with the code change, a bug report associated with the code change, a third party comment (e.g., on a forum or blog) about the code change, documentation such as release notes describing the code change, a number of software dependencies relied upon by the code change, an output from a machine-learning model configured to analyze the code change for defects, or any combination of these.

In some examples, the system can repeat the above process to generate individual risk scores for each of the software application's features used by the end user. Additionally or alternatively, the system can generate a holistic risk score for the update. A holistic risk score is a single risk score for the update as a whole. For example, the system can combine and weight the individual risk scores to generate a holistic risk score for the update. The system can then present some or all of this risk information to the end user. For example, the system can generate an interactive graphical user interface (GUI) that may present the holistic risk score for the update to the end user, where the user can then interact with the GUI to view the individual risk scores that contributed to the holistic risk score.

In some examples, the system can be have an automatic update mode that can be activated by the end user. In the automatic update mode, the system can automatically apply an update or flag an update, depending on a risk score associated with the update. For example, the system can monitor for new updates associated with the software application. Each time the system becomes aware of a new update, the system can determine a risk score associated with the new update using one or more of the above-described techniques. The system can then compare the risk score to a predefined threshold to determine if the risk score is below the predefined threshold. If so, the system can automatically apply the update on the computing device of the end user. Otherwise, the system can automatically flag the update for manual inspection by the end user or automatically reject the update to prevent the update from being applied at that point in time.

The system can also transmit feedback about the update to the software developers that created the update, in some examples. The feedback can indicate the risk score generated by the system along with one or more factors contributing to the risk score. This can help the software developers determine how the end user may perceive the update from a risk perspective and which factors may be increasing the risk to the end user, so that the software developers can identify problems with the update and improve the update. The feedback may further indicate whether or not the update was applied by the end user, so that the software developers can determine whether the risk score influenced the end user's ultimate decision. Such feedback can assist the software developers in generating software updates that achieve wider acceptance among end users.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
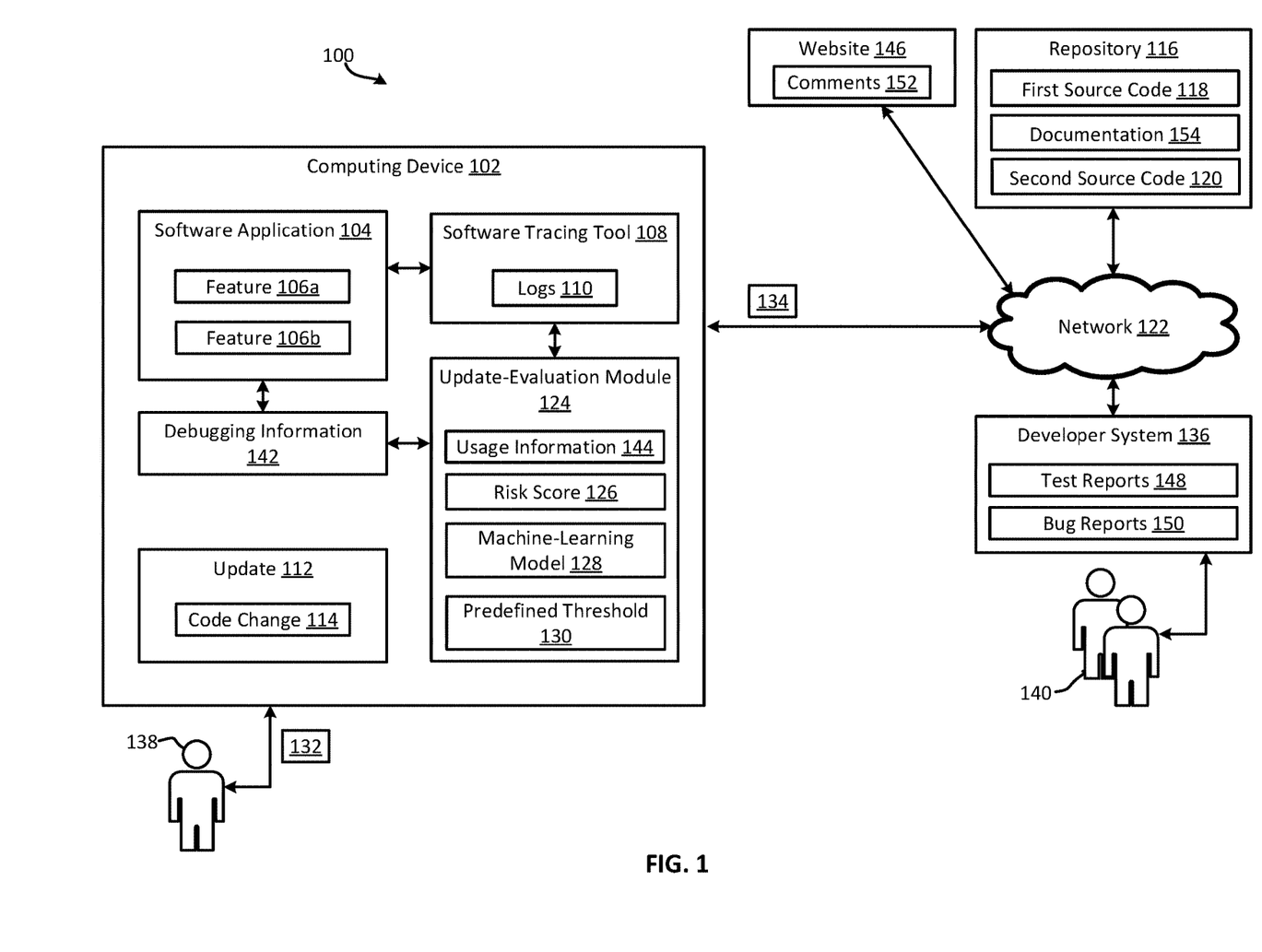
FIG. 1 is a block diagram of an example of a system for mitigating software-update risks for end users according to some aspects of the present disclosure.

FIG. 1 is a block diagram of an example of a system 100 for mitigating software-update risks for end users according to some aspects of the present disclosure. The system 100 includes a computing device 102, such as a laptop computer, desktop computer, tablet, server, or mobile phone. The computing device 102 can include a software application 104. The software application 104 can include any number of features, such as features 106a-b, that can be used by the end user 138 to perform various tasks.

After the software application 104 is released to end users, an update 112 for the software application 104 may become available. Prior to applying the update 112, the end user 138 may wish to evaluate the update 112 to determine a risk level associated with the update 112. To that end, the end user 138 may execute a update-evaluation module 124 on the computing device 102.

The update-evaluation module 124 can be a software module that is downloadable and installable on the computing device 102. The update-evaluation module 124 can receive usage information 144 indicating how the end user 138 used the software application 104 and generate a risk score 126 based on the usage information 144. In some examples, the usage information 144 can include debugging information 142 generated by the software application 104. For example, the software application 104 can be configured to execute in a debugging mode. While in the debugging mode, the software application 104 can generate the debugging information 142 in response to the end user 138 interacting with features 106a-b of the software application 104. Additionally or alternatively, the usage information 144 can include logs 110 generated by a software tracing tool 108. Examples of the software tracing tool 108 can include Jaeger and DTrace. The software tracing tool 108 can generate the logs 110 (e.g., tracing logs) in response to the end user 138 interacting with the features 106a-b of the software application 104. The usage information 144 can indicate which features 107a-b of the software application 104 were used by the end user 138. The update-evaluation module 124 can receive such usage information 144 and generate the risk score 126 based thereon, so that the risk score 126 is tailored to how the end user 138 actually used the software application 104.

More specifically, the update-evaluation module 124 can analyze the usage information 144 to determine which features 106a-b of the software application 104 were used by the end user 138. The update-evaluation module 124 can then determine if the update 112 includes changes to those features 106a-b. To do so, the update-evaluation module 124 can obtain first source code 118 corresponding to the update 112. For example, the first source code 118 may be stored in a repository 116, such as a GitHub repository. So, the update-evaluation module 124 can retrieve the first source code 118 from the repository 116 via a network 122, such as a local area network or the Internet. The update-evaluation module 124 can also obtain second source code 120 corresponding to the existing version of the software application 104 on the computing device 102. For example, the second source code 120 may also be stored in a repository, which may be the same as or different from repository 116. So, the update-evaluation module 124 can retrieve the second source code 120 from the repository via the network 122. The update-evaluation module 124 can then compare the first source code 118 to the second source code 120 to determine a code change 114 between the two. The code change 114 may correspond to one feature 106a or multiple features 106a-b used by the end user 138. The presence of the code change 114 may mean that there is at least some risk to the end user 138 in applying the update 112.

The update-evaluation module 124 can next generate the risk score 126 based on the code change 114. The update-evaluation module 124 can determine the risk score 126 based on any number and combination of factors associated with the code change. For example, the update-evaluation module 124 can access a website 146 associated with the code change 114. The website 146 may include a blog, forum, or other page that includes third party comments 152 from software developers or other end users. One example of such a website 146 may be GitHub. The comments 152 can indicate the quality of the update 112 in general, or may indicate the quality of the code change 114 in particular. If the comments 152 have a negative sentiment, it may mean that the update 112 is more risky for the end user 138. If the comments 152 have a positive sentiment, it may mean that the update 112 is less risky for the end user 138. The update-evaluation module 124 can analyze the comments 152 for keywords or other characteristics indicating the sentiment thereof, for example using a trained machine-learning model 128 (e.g., a neural network or classifier) configured to perform sentiment analysis. Based on the identified characteristics of the comments 152, the update-evaluation module 124 can calculate the risk score 126 accordingly.

Additionally or alternatively, the update-evaluation module 124 can determine the risk score 126 based on a test report 148 associated with the code change 114. The update-evaluation module 124 can retrieve the test report 148 from a location at which the test report 148 is stored, such as a developer system 136 associated with the software developers 140 that generated the update 112. The test report 148 can indicate the results of software tests executed on the update 112. The software tests may have been performed during a software development process that occurred prior to the update 112 being released to the end users. Examples of the software tests can include unit tests, integration tests, and system tests. The results of the software tests may indicate the quality of the code change 114, which can serve as a factor that influences the risk score 126. The update-evaluation module 124 can analyze the test report 148 and generate the risk score 126 based on this analysis. For example, if the test report 148 indicates that the code change 114 is of higher quality, the update-evaluation module 124 may generate a correspondingly lower risk-score. And if the test report 148 indicates that the code change 114 is of lower quality, the update-evaluation module 124 may generate a correspondingly higher risk-score.

The update-evaluation module 124 can additionally or alternatively determine the risk score 126 based on a bug report 150 from a third party. The update-evaluation module 124 can retrieve the bug report 150 from a location at which the bug report 150 is stored, such as the developer system 136. The bug report 150 may indicate a bug associated with a feature 106a used by the end user 138. The bug report 150 may also indicate the severity of the bug according to a predefined scale. The update-evaluation module 124 can analyze the bug report 150 and generate the risk score 126 based on this analysis. For example, if the bug is of higher severity, the update-evaluation module 124 may generate a correspondingly higher risk-score. And if the bug is of lower severity, the update-evaluation module 124 may generate a correspondingly lower risk-score.

Additionally or alternatively, the update-evaluation module 124 can determine the risk score 126 based on documentation 154 accompanying the update 112. The documentation 154 may be associated with the update 112 more generally, or the documentation 154 may be specific to the code change 114 in particular. In some examples, the documentation 154 can include release notes describing software changes made in the update 112. The update-evaluation module 124 can obtain the documentation 154 from a location at which the documentation 154 is stored, such as the repository 116. The update-evaluation module 124 can analyze the documentation 154 and generate the risk score 126 based on this analysis. For example, the update-evaluation module 124 can analyze the documentation 154 for certain keywords to determine one or more characteristics of the update 112 that may positively or negatively influence the risk score 126.

In some examples, the update-evaluation module 124 can determine the risk score 126 based on other factors. For example, the update-evaluation module 124 can analyze the first source code 118 corresponding to the update 112 to determine a number of software dependencies relied upon by the code change 114. Examples of such software dependencies can include libraries, drivers, or other software elements that are separate from the first source code 118 of the update 112 and relied upon for proper operation. Such software dependencies are generally maintained separately from the first source code 118 of the update 112, for example by software developers that are different than the software developers 140 that created the update 112. As a result, a larger number of software dependencies may increase the risk of error to the end user 138, while a smaller number of software dependencies may decrease the risk of error to the end user 138. So, the update-evaluation module 124 may generate a higher risk-score 126 if the number of software dependencies is larger and a lower risk-score 126 if the number of software dependencies is smaller.

Additionally or alternatively, the update-evaluation module 124 can determine the risk score 126 based on an output from a trained machine-learning model 128. In some examples, the machine-learning model 128 can be configured to analyze the code change 114 for defects. The machine-learning model 128 may be trained using training data that includes defective code, so that the machine-learning model 128 learns to identify certain types of software defects. Once trained, the machine-learning model 128 can be used to analyze the first source code 118 associated with the update 112 to identify software defects and produce an output based on the identified software defects. The update-evaluation module 124 can then determine the risk score 126 based on the output from the machine-learning model 128.

The update-evaluation module 124 can use some or all of the above techniques to generate a risk score 126. In some examples, the update-evaluation module 124 may weight certain techniques more heavily than others to generate the risk score 126. The risk score 126 can be a holistic risk score corresponding to the update 112 as a whole, or the risk score 126 can be a more-specific risk score corresponding to the individual feature 106*a* or group of features 106*a-b*.

After generating the risk score 126, the update-evaluation module 124 can output the risk score 126 to the end user 138. For example, the update-evaluation module 124 can output the risk score 126 to the end user 138 on a display device coupled to the computing device 102. Examples of the display device can include a liquid crystal display (LCD) or light-emitting diode (LED) display. The risk score 126 may be output as part of a graphical user interface, with which the end user 138 may be able to interact to obtain more information about the risk score 126. For example, the update-evaluation module 124 can output the graphical user interface to the end user 138. The end user 138 can then provide user input 132 to interact with the graphical user interface. In response to the user input 132, the update-evaluation module 124 can update the graphical user interface to indicate one or more factors that contributed to the risk score 126. This can enable the end user 138 to better understand why the update 112 received a particular risk score.

In some examples, the update-evaluation module 124 can be have an automatic update mode that can be selectively activated by the end user 138. In the automatic update mode, the update-evaluation module 124 can automatically apply an update or automatically flag an update, depending on the risk score 126 associated with the update 112. For example, the update-evaluation module 124 can detect new updates associated with the software application 104. The update-evaluation module 124 may detect the new updates by communicating with an update server or monitoring a repository (e.g., repository 116) associated with software application updates. In response to detecting an update 112, the update-evaluation module 124 can determine the risk score 126 associated with the update 112. The update-evaluation module 124 can then compare the risk score 126 to a predefined threshold 130 to determine a relationship between the risk score 126 and the predefined threshold 130. The predefined threshold 130 may be user customizable. If the risk score 126 has a particular relationship to the predefined threshold 130, then the update-evaluation module 124 can automatically apply the update 112 on the computing device 102. For example, the update-evaluation module 124 can automatically apply the update 112 in response to determining that the risk score 126 is below the predefined threshold 130. This arrangement may be applicable in circumstances where a lower risk-score indicates a lower risk to the end user 138. As another example, the update-evaluation module 124 can automatically apply the update 112 in response to determining that the risk score 126 is above the predefined threshold 130. This arrangement may be applicable in circumstances where a higher risk-score indicates a lower risk to the end user 138. If the risk score 126 does not have the particular relationship to the predefined threshold 130, then the update-evaluation module 124 can automatically flag the update 112 for manual consideration by the end user 138 or automatically reject the update 112.

In some examples, the update-evaluation module 124 can transmit feedback 134 about the update 112 to software developers 140 associated with the update 112. For example, the update-evaluation module 124 can transmit the feedback 134 over the network 122 to the developer system 136 associated with the software developers 140, where the developer system 136 is separate from the computing device 102 of the end user 138. The feedback 134 can indicate the risk score 126 that was generated by the update-evaluation module 124. The feedback 134 may also indicate one or more of the factors that contributed to the risk score 126. This can help the software developers 140 identify problems influencing the risk score 126 and understand how the end user 138 may perceive the update from a risk perspective. The feedback 134 may further indicate whether or not the update 112 was applied on the computing device 102, so that the software developers 140 can determine an impact of the risk score 126 on the application of the update 112. Such feedback 134 can assist the software developers 140 in generating better software updates that achieve wider acceptance among end users.

Although FIG. 1 depicts a certain number and arrangement of components, this is intended to be illustrative and non-limiting. Other examples may involve more components, fewer components, different components, or a different configuration of the component shown in FIG. 1. For instance, the developer system 136 can include the repository 116, first source code 118, documentation 154, second source code 120, website 146, or any combination of these in another example. And although the update 112 is located on the computing device 102 in FIG. 1, it will be appreciated that the update 112 may be stored on an update server or maintained in another location while the update-evaluation module 124 is evaluating the update 112. For example, the computing device 102 may not download the update 112 until after the update-evaluation module 124 has generated the risk score 126, if the update 112 is downloaded at all. This may avoid expending computing resources and bandwidth on downloading an update 112 that may ultimately be too risky to install. Additionally, although the update-evaluation module 124 is depicted as being located on the computing device 102 in FIG. 1, in other examples the update-evaluation module 124 may be located elsewhere, such as on a remote server with which the computing device 102 can interact via the network 122 to determine a risk score 126 for an update 112.

Figure 2:
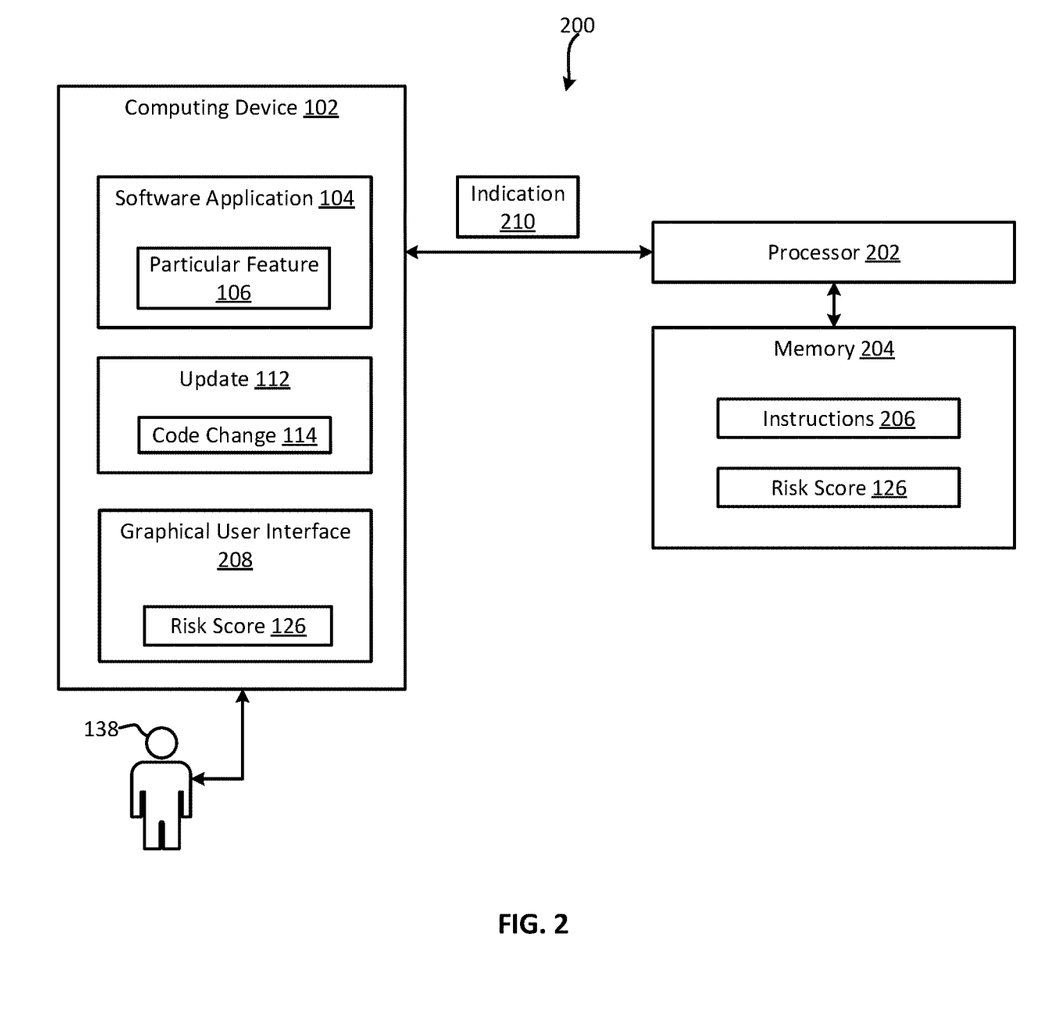
FIG. 2 is a block diagram of another example of a system for mitigating software-update risks for end users according to some aspects of the present disclosure.

FIG. 2 is a block diagram of another example of a system 200 for mitigating software-update risks for end users according to some aspects of the present disclosure. The system 200 includes a processor 202 communicatively coupled with a memory 204. In some examples, the processor 202 and the memory 204 can be remote from the computing device 102. For example, the processor 202 and the memory 204 may be parts of a server that is separate from the computing device 102 and accessible to the computing device 102 via a network. In other examples, the processor 202 and the memory 204 can be part of the computing device 102.

The processor 202 can include one processor or multiple processors. Examples of the processor 202 can include a Field-Programmable Gate Array (FPGA), an application-specific integrated circuit (ASIC), or a microprocessor. The processor 202 can execute instructions 206 stored in the memory 204 to perform operations. The instructions 206 may include processor-specific instructions generated by a compiler or an interpreter from code written in any suitable computer-programming language, such as C, C++, C#, etc. In some examples, the instructions 206 can include the update-evaluation module 124 of FIG. 1.

The memory 204 can include one memory or multiple memories. The memory 204 may be a volatile memory or a non-volatile memory. Examples of a volatile memory can include random-access memory (RAM) or a cache memory. Examples of a non-volatile memory can include flash memory, electrically erasable and programmable read-only memory (EEPROM), or a hard disk. At least some of the memory 204 can include a non-transitory computer-readable medium on which the instructions 206 are stored. A computer-readable medium can include electronic, optical, magnetic, or other storage devices capable of providing the processor 202 with computer-readable instructions or other program code. Examples of a computer-readable medium include magnetic disks, memory chips, ROM, RAM, an ASIC, a configured processor, optical storage, or any other medium from which a computer processor can read the instructions 206.

In some examples, the processor 202 can execute the instructions 206 to perform one or more operations. For example, the processor 202 can receive an indication 210 that that an end user 138 used a particular feature 106 of an existing version of a software application 104 on a computing device 102 of the end user 138. The processor 202 can receive (e.g., via a network) the indication 210 from the computing device 102 or from another source. In some examples, the indication 210 may include usage information generated by the computing device 102, where the usage information can indicate that the end user 138 used the particular feature 106 of the software application 104. The processor 202 can also determine that an update 112 for the software application 104 includes a code change 114 to the particular feature 106. For example, the processor 202 can obtain first source code corresponding to the update 112 and second source code 120 corresponding to the existing version of the software application 104 on the computing device 102. The processor 202 can then compare the first source code to the second source code to identify the code change 114. Based on the code change 114, the processor 202 can generate a risk score 126 for the update 112. The processor 202 can generate the risk score 126 using any technique or combination of techniques described herein. The processor 202 may then generate a graphical user interface 208 for display on the computing device 102 of the end user 138 (e.g., for display on a display device coupled to the computing device 102). The graphical user interface 208 can indicate the risk score 126 for the end user 138 with respect to the update 112. This may assist the end user 138 in determining whether to apply the update 112 to the existing version of the software application 104.

Figure 3:
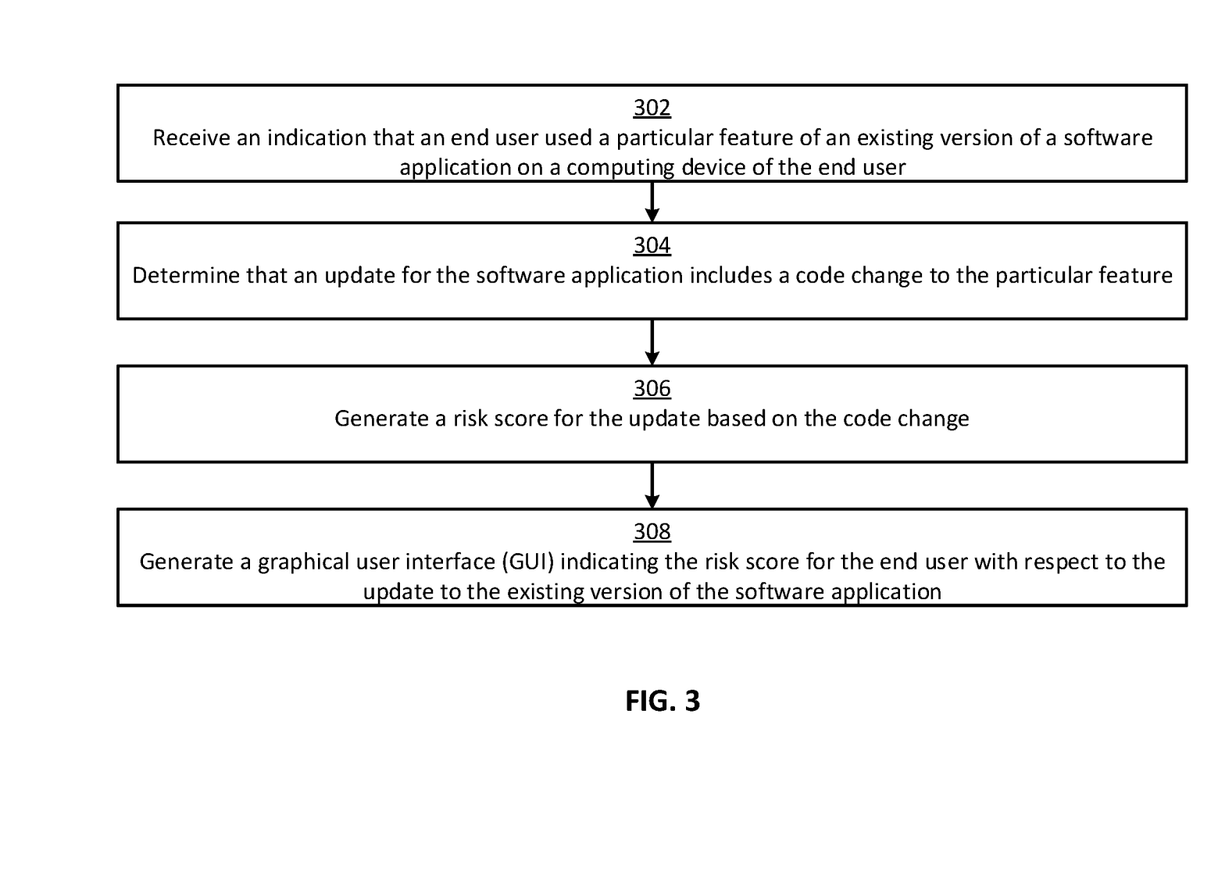
FIG. 3 is a flow chart of an example of a process for mitigating software-update risks for end users according to some aspects of the present disclosure.

FIG. 3 is a flow chart of an example of a process for mitigating software-update risks for end users according to some aspects of the present disclosure. Other examples may involve more steps, fewer steps, different steps, or a different order of the steps shown in FIG. 3. The steps of FIG. 3 are described below with reference to the components of FIG. 2 described above.

In block 302, a processor 202 receives an indication 210 that an end user 138 used a particular feature 106 of an existing version of a software application 104 on a computing device 102 of the end user 138. For example, the processor 202 can receive usage information indicating how the end user 138 used the software application 104 during one or more executions of the software application 104. The processor 202 can receive the usage information from the computing device 102 or another source. The usage information may include a log generated by a software tracing tool or debugging information generated by the software application 104. The processor 202 can analyze the usage information to determine one or more features of the software application 104 with which the end user 138 interacted during the one or more executions of the software application 104.

In block 304, the processor 202 determines that an update 112 for the software application 104 includes a code change 114 to the particular feature 106. For example, the processor 202 can make this determination by comparing first source code associated with the update 112 to second source code associated with the existing version of a software application 104 on the computing device 102, in order to determine a difference between the two. The difference can be the code change 114.

In block 306, the processor 202 generates a risk score 126 for the update 112 based on the code change 114. For example, the processor 202 can generate the risk score 126 based on characteristics of the code change 114. The processor 202 can determine the characteristics based on any number and combination of factors, such as the contents of a test report, a bug report, a comment, an output from a trained machine-learning model, a piece of documentation accompanying the code change 114, the code change itself, or another information source associated with the code change.

In some examples, the processor 202 can combine two or more sub-scores to generate the risk score 126. For example, the processor 202 can generate the sub-scores based on two or more of the abovementioned factors and combine the sub-scores together to generate the risk score 126. Combining the sub-scores may involve adding the sub-scores, subtracting the sub-scores, multiplying the sub-scores, and/or applying other mathematical operations to the sub-scores. In some examples, the sub-scores can be weighted such that certain sub-scores have a larger influence on the risk score 126 than other sub-scores.

In block 308, the processor 202 generates a graphical user interface 208 indicating the risk score 126 for the end user 138 with respect to the update 112 to the existing version of the software application 104. The processor 202 can then cause the graphical user interface 208 to be output on a display device coupled to the computing device 102.

In some examples, the graphical user interface 208 can be interactive, in that the end user 138 can manipulate the graphical user interface 208 to obtain more information about the risk score 126. For example, the end user 138 can interact with the graphical user interface 208 to view one or more factors that contributed to the risk score 126. These factors may be initially hidden from view and only revealed upon request by the end user 138. The factors can be presented in a tabular or graphical form to be easier to digest for the end user 138.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, examples described herein can be combined together to yield still further examples

The invention claimed is:

1. A system comprising:
a processor; and
a memory including instructions that are executable by the processor for causing the processor to:
receive usage information describing how an end user used an existing version of a software application on a computing device of the end user, the usage information indicating that the end user used a particular feature among a plurality of features of the software application;

analyze source code associated with an update for the software application based on the usage information to determine whether the source code includes a code change to the particular feature used by the end user;
in response to determining that the source code includes the code change to the particular feature used by the end user, generate a risk score for the update based on the code change;
based on generating the risk score, generate a graphical user interface (GUI) indicating the risk score for the end user with respect to installing the update to the existing version of the software application; and
subsequent to generating the graphical user interface:
receive user input indicating that the update is not to be applied to the existing version of the software application; and
transmit feedback to a software developer associated with the update, the feedback including the risk score and indicating that the update was not applied by the end user to the existing version of the software application.

2. The system of claim 1, wherein the memory further instructions that are executable by the processor for causing the processor to generate the usage information based on an output from a software tracing tool associated with the existing version of the software application.

3. The system of claim 1, wherein the memory further instructions that are executable by the processor for causing the processor to determine that the update includes the code change by:
receiving first source code for the particular feature in the update;
receiving second source code for the particular feature in the existing version of the software application; and
comparing the first source code to the second source code to identify a difference between the first source code and the second source code, the difference being the code change.

4. The system of claim 1, wherein the memory further instructions that are executable by the processor for causing the processor to generate the risk score based on a test report associated with the code change, a bug report associated with the code change, a third party comment associated with the code change, documentation associated with the code change, a number of software dependencies associated with the code change, and an output from a machine-learning model.

5. The system of claim 1, wherein the memory further instructions that are executable by the processor for causing the processor to:
detect a user interaction with the graphical user interface; and
in response to detecting the user interaction, output a factor contributing to the risk score in the graphical user interface.

6. A method comprising:
receiving, by a processor, usage information describing how an end user used an existing version of a software application on a computing device of the end user, the usage information indicating that the end user used a particular feature among a plurality of features of the software application;
analyzing, by the processor, source code associated with an update for the software application based on the usage information to determine whether the source code includes a code change to the particular feature used by the end user;
in response to determining that the source code includes the code change to the particular feature used by the end user, generating, by the processor, a risk score for the update based on the code change;
based on generating the risk score, generating, by the processor, a graphical user interface (GUI) indicating the risk score for the end user with respect to installing the update to the existing version of the software application; and
subsequent to generating the graphical user interface:
receiving, by the processor, user input indicating that the update is not to be applied to the existing version of the software application; and
transmitting, by the processor, feedback to a software developer associated with the update, the feedback including the risk score and indicating that the update was not applied by the end user to the existing version of the software application.

7. The method of claim 6, generating the usage information based on debugging information output from the existing version of the software application while the existing version of the software application is in a debugging mode.

8. The method of claim 6, further comprising determining that the update includes the code change by:
receiving first source code for the particular feature in the update;
receiving second source code for the particular feature in the existing version of the software application; and
comparing the first source code to the second source code to identify a difference between the first source code and the second source code, the difference being the code change.

9. The method of claim 6, further comprising generating the risk score based on a test report associated with the code change, the test report indicating results of one or more software tests executed on the update.

10. The method of claim 9, further comprising generating the risk score based on a bug report associated with the code change, the bug report being different from the test report and including a description of a bug identified by one or more end users.

11. The method of claim 6, further comprising generating the risk score based on a third party comment associated with the code change, the third party comment being obtained from a website comprising a plurality of comments about the software application from a plurality of entities.

12. The method of claim 6, further comprising generating the risk score based on documentation associated with the code change, the documentation including release notes describing software changes to the software application.

13. The method of claim 6, further comprising generating the risk score based on a number of software dependencies associated with the code change.

14. The method of claim 6, wherein the feedback includes at least one factor contributing to the risk score.

15. The method of claim 6, further comprising:
detecting a user interaction with the graphical user interface; and
in response to detecting the user interaction, outputting a plurality of factors contributing to the risk score in the graphical user interface.

16. A non-transitory computer-readable medium comprising program code that is executable by a processor for causing the processor to:
receive usage information describing how an end user used an existing version of a software application on a computing device of the end user, the usage information indicating that the end user used a particular feature among a plurality of features of the software application;

analyze source code associated with an update for the software application based on the usage information to determine whether the source code includes a code change to the particular feature used by the end user;

in response to determining that the source code includes the code change to the particular feature used by the end user, generate a risk score for the update based on the code change;

based on generating the risk score, generate a graphical user interface (GUI) indicating the risk score for the end user with respect to installing the update to the existing version of the software application; and subsequent to generating the graphical user interface:
   receiving, by the processor, user input indicating that the update is not to be applied to the existing version of the software application; and
   transmitting, by the processor, feedback to a software developer associated with the update, the feedback including the risk score and indicating that the update was not applied by the end user to the existing version of the software application.

17. The method of claim 6, further comprising generating the risk score based on an output from a machine-learning model trained using training data that includes defective code, the machine-learning model being configured to analyze the code change for defects.

* * * * *